C. H. JOHNSON. BEST AVAILABLE COPY
Gas Burner.
No. 138. A. I. Patented March 18, 1856.
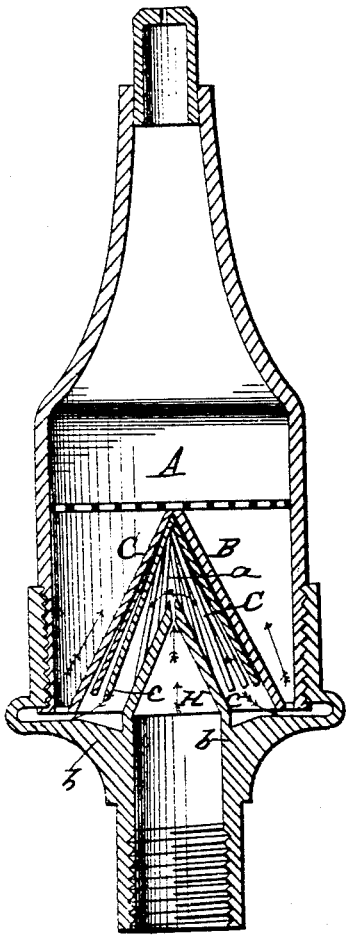
N. PETERS, Photo-Lithographer, Washington, D. C.